United States Patent [19]

Wilhelm et al.

[11] 4,089,026
[45] May 9, 1978

[54] COLOR BAR GENERATOR

[75] Inventors: Rudolf Wilhelm, Klein-Gerau; Jürgen Heitmann, Seeheim, both of Germany

[73] Assignee: Robert Bosch GmbH, Germany

[21] Appl. No.: 785,764

[22] Filed: Apr. 7, 1977

[30] Foreign Application Priority Data

Apr. 10, 1976 Germany .............................. 2615783

[51] Int. Cl.² .............................................. H04N 9/62
[52] U.S. Cl. .................................................... 358/10
[58] Field of Search .................................. 358/10, 139

[56] References Cited

U.S. PATENT DOCUMENTS 3,529,079  9/1970  Moskovitz ............................ 358/10
3,879,749  4/1975  Baum .................................... 358/10

OTHER PUBLICATIONS

Hendil, "Combined Colour/Monochrome Pattern Generator PM 5544", *Electronic Measuring and Microwave Notes,* 1970, No. 2, pp. 1-6.

*Primary Examiner*—John C. Martin
*Attorney, Agent, or Firm*—Littlepage, Quaintance, Murphy, Richardson and Webner

[57] ABSTRACT

The invention provides an apparatus for producing video frequency color value signals which correspond to a desired arrangement of vertical or horizontal color bars on a television screen. In the case of vertical color bars the apparatus derives during each line period an identical series of pulses having a multiple of the line frequency. Each series of pulses is applied to a binary counter which provides as output a sequence of sets of binary signals. This sequence of sets of binary signals is translated by a pre-programmed store into a further sequence of sets of binary signals, these latter sets of signals being applied to a digital-to-analogue converter adapted to derive therefrom corresponding sets of color value signals. Each set of color value signals defines a differently colored line segment. The effect of this operation over a plurality of successive line periods is to build up a number of vertical color bars each composed of vertically adjacent line segments of the same color derived from identical sets of color value signals occurring in successive line periods.

In the case of horizontal color bars the apparatus operates in a similar manner except that the series of pulses initially produced is at a fraction of the line frequency and is derived once from each field period rather than once for each line period.

14 Claims, 3 Drawing Figures

COLOR BAR GENERATOR

BACKGROUND OF THE INVENTION

1. Field of the Invention

The invention concerns an apparatus for producing colour value signals which correspond to a desired arrangement of colour bars.

2. Description of the Prior Art

In the book "Farbfernsehen 2," by Helmut Schönfelder, pages 212 to 213, there is disclosed a method of producing video frequency colour bar signals wherein a sequence of keying pulses at horizontal frequency is derived by means of a chain of bistable flip-flop stages. The keying pulses can be connected through a switching field to distribution stages. Because a predetermined colour is allocated to each distribution stage, certain colour bar sequences can be selected according to the circuit connections. For comparative tests the European Broadcasting Union (E.B.U.) has laid down as a standard colour bar test a colour bar sequence arranged in descending brightness values. In this test the level of a luminance bar (white) is 100%. The levels of the colour bars are reduced to 75%. The level reduction of the colour bars was formerly effected by pulsed voltage dividers. The generation of the necessary keying pulse signal is very costly in circuitry. For the video frequency color bar signals R. G and B a level deviation of only ± 0.5% is permissible. The maintenance of this tolerance requires the use of expensive temperature compensated circuits which have to be adjusted in time-consuming operations.

It is an object of the invention to provide an alternative means of producing colour bars which avoids these disadvantages.

According to the present invention there is provided an apparatus for producing video frequency color value signals which correspond to a desired arrangement of vertical colour bars on a television screen, comprising means for producing during each of a plurality of successive line periods a series of signals having a separation less than line period, means for applying each series of signals so produced to a sequence generator adapted to generate a predetermined sequence of sets of binary signals in response to each series of signals, each set of binary signals being generated in response to a respective one of the series of signals, a signal translator adapted to provide a predetermined sequence of further sets of binary signals in response to each sequence of firstmentioned sets of binary signals, each further set of binary signals being produced in response to a respective one of the firstmentiond sets and having binary values determined by the values of the said respective firstmentioned set, and a digital-to-analogue converter adapted to derive from each sequence of further sets of binary signals a sequence of sets of color value signals, the sets of colour value signals corresponding to the colours of the desired colour bars.

The invention further provides an apparatus for producing video frequency colour value signals which correspond to a desired arrangement of horizontal colour bars on a television screen, comprising means for producing during each of a plurality of successive field periods a series of signals having a separation greater than the line period, means for applying each series of signals so produced to a sequence generator adapted to generate a predetermined sequence of sets of binary signals in response to each series of signals, each set of binary signals being generated in response to a respective one of the series of signals, a signal translator adapted to provide a predetermined sequence of further sets of binary signals in response to each sequence of firstmentioned sets of binary signals, each further set of binary signals being produced in response to a respective one of the firstmentioned sets and having binary values determined by the values of the said respective firstmentioned set, and a digital-to-analogue converter adapted to derive from each sequence of further sets of binary signals a sequence of sets of colour value signals, the sets of colour value signals corresponding to the colours of the desired colour bars.

By the use of the invention it is possible to generate in a simple manner colour value signals for vertically or horizontally arranged colour bars.

BRIEF DESCRIPTION OF THE DRAWINGS

An embodiment of the invention will now be described by way of example with reference to the accompanying drawings, in which.

DESCRIPTION OF PREFERRED EMBODIMENTS

Figure 1:
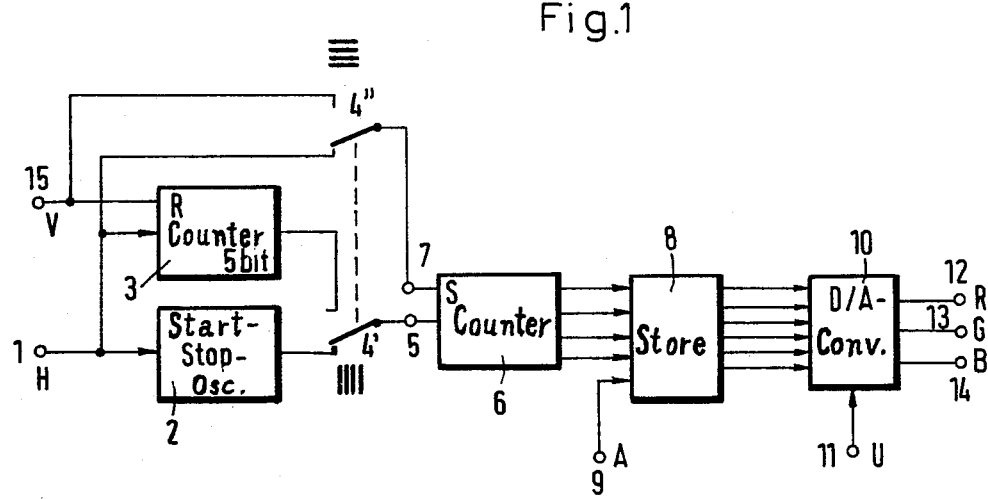
FIG. 1 is a block circuit diagram of an apparatus according to the invention.

In the block circuit diagram of FIG. 1 horizontal frequency pulses H applied at a terminal 1 are delivered both to a start-stop oscillator 2 and the counting input of a settable 5-bit binary counter 3. The start-stop oscillator 2 is arranged to oscillate at ten times the horizontal frequency. The output of the oscillator 2 and the horizontal frequency pulses H are passed to coupled change-over switches 4' and 4" respectively. With the movable contacts of the coupled switches 4' and 4" in the lower position shown the apparatus is set up for generating vertical colour bars and in this setting the counter 5 is not used. For the time being the description will deal with the apparatus set as shown for generating vertical colour bars; the generation of horizontal colour bars with the movable contacts in their upper position will be dealt with later.

The start-stop oscillator 2 produces during each line period a series of signals at ten times the horizontal frequency. As will be described, the signals of each series are used to produce, during the corresponding line period, a sequence of sets of colour value signals defining differently coloured line segments corresponding to the desired colour bar sequence. The series of signals is repeated with identical timing in each line period and gives rise to an identical sequence of colour value signal sets, whereby vertical colour bars may be built up from adjacent similarly coloured line segments in successive lines. The detailed description which follows will concern the events occurring during one line period, but it is to be understood that the cycle repeats in identical fashion for each line period.

The series of signals derived from the output of the start-stop oscillator 2 pass through the switch 4' to the counting input 5 of a dual binary counter 6 serving as a sequence generator. Furthermore, in the position of the changeover switches shown in the drawing, the horizontal frequency pulses H are delivered through the switch 4" to a setting input 7 of the counter 6. In the present practical example the dual counter 6 is a 4-bit counter, which is operated in the reverse counting mode.

The sequence generator or counter 6 provides a sequence of sets of four binary signals, each set of the sequence being generated by the counter 6 in response to a respective signal at the counting input 5. In this particular example the sequence is a binary representation of descending consecutive integers. The horizontal frequency pulses H at input 7 reset the counter 6 at the beginning of each line period so that the same sequence is generated for each line.

The four outputs of the dual counter 6 are connected to respective inputs of a fixed value store 8 serving as a signal translator. A blanking signal A is applied through a terminal 9 to a further input of the fixed value store 8. The store or translator 8 provides as output a sequence of further sets of binary signals in response to the sequence of firstmentioned sets applied as input, each further set being generated in response to a respective one of the firstmentioned sets and having binary values determined by the values of the said respective firstmentioned set and the value of the blanking signal according to a truth table to be described later.

The sequence of further binary signal sets produced at the outputs of the fixed value store 8 are connected to the inputs of a digital/analog converter 10, which is connected through a terminal 11 to a source of reference voltage U. At the outputs 12, 13 and 14 of the digital/analog converter 10 there are available red, green and blue colour value signals R, G and B respectively. The sequence of sets of binary signals generated at the outputs of the translator 8 produces, via the converter 10, a corresponding sequence of sets of colour value signals R, G and B. Each set of colour value signals, when additively combined in known manner and reproduced on a television screen, will (due to the choice of truth table for the translator 8 and construction of the converter 10, both to be described) produce a respective line segment of one of the desired colour bar colours. The entire sequence of colour value signal sets will produce a plurality of consecutive line segments of different colours, the colours being those of the desired colour bars and arranged in the desired sequence of the colour bars. The repetition of the above described sequence in successive line periods builds up the vertical colour bars.

Figure 2:
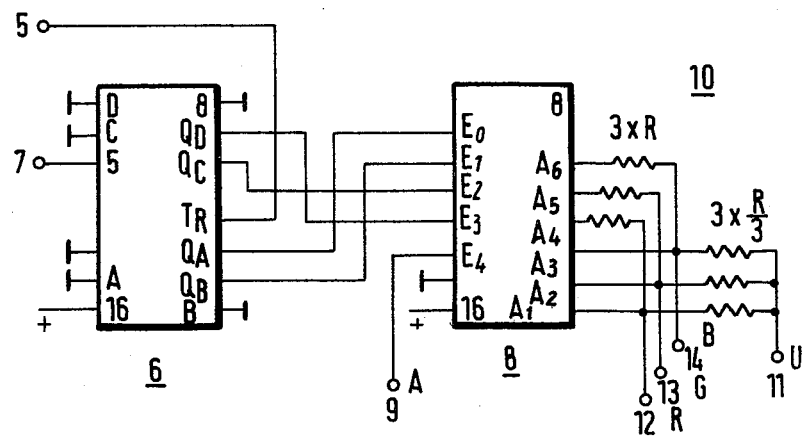
FIG. 2 shows portions of the block circuit diagram of FIG. 1 in more detail.

The blocks 6, 8 and 10 appearing in the block circuit diagram of FIG. 1 are shown in more detail in FIG. 2. Those parts of FIG. 2 which perform the same function as the equivalent parts in the block schematic diagram of FIG. 1 are indicated with the same reference characters. The dual counter 6 may be embodied in practice by using an integrated circuit binary 4-bit reversible counter with programmable setting inputs, e.g. of the type SN74193. In the present application setting inputs A, B, C and D (FIG. 2) are at a down (L) level. Upon the establishment of an L level at input 7 by a horizontal frequency pulse H, the information set at the inputs A to D is taken up, that is to say the outputs $Q_A$, $Q_B$, $Q_D$ and $Q_C$ assume L level. The reverse counting of the dual counter 6 is brought about by the series of signals at the input 5. The reverse counting mode was selected because the existence of an L level at the output $Q_D$ of the dual counter 6 clearly determines the black value of a colour bar signal. By this means in the region of the blanking gaps the video frequency colour bar signals are maintained at the black level even if frequency deviations of the oscillator 2 should occur caused by aging of individual components. At the same time the condition is avoided which would result from the frequency of the oscillator being too high so that between a black bar and the blanking signal A a signal value is delivered deviating from the black level.

The outputs $Q_A$ to $Q_D$ (at which the sequence of first firstmentioned binary signal sets are produced) of the dual counter 6 are connected to the inputs $E_0$ to $E_3$ of the signal translator or fixed value store 8. The fixed value store 8 may also be an integrated circuit, e.g. of the type SN 74188–01P. In the present embodiment the fixed value store 8 is programmed so that it satisfies the truth table set out in Table 1.

TABLE 1

| inputs: | | | | | outputs: | | | | | |
|---|---|---|---|---|---|---|---|---|---|---|
| $E_4$ | $E_3$ | $E_2$ | $E_1$ | $E_0$ | $A_6$ | $A_5$ | $A_4$ | $A_3$ | $A_2$ | $A_1$ |
| L | L | L | L | L | L | L | L | L | L | L |
| L | L | L | L | H | L | L | L | L | L | L |
| L | L | L | H | L | L | L | L | L | L | L |
| L | L | L | H | H | L | L | L | L | L | L |
| L | L | H | L | L | L | L | L | L | L | L |
| L | L | H | L | H | L | L | L | L | L | L |
| L | L | H | H | L | L | L | L | L | L | L |
| L | L | H | H | H | L | L | L | L | L | L |
| L | H | L | L | L | L | L | L | L | L | L |
| L | H | L | L | H | L | L | L | L | L | L |
| L | H | L | H | L | L | L | L | L | L | L |
| L | H | L | H | H | L | L | L | L | L | L |
| L | H | H | L | L | L | L | L | L | L | L |
| L | H | H | L | H | L | L | L | L | L | L |
| L | H | H | H | L | L | L | L | L | L | L |
| L | H | H | H | H | L | L | L | L | L | L |
| H | L | L | L | L | L | L | L | L | L | L |
| H | L | L | L | H | L | L | L | L | L | L |
| H | L | L | H | L | L | L | L | L | L | L |
| H | L | L | H | H | L | L | L | L | L | L |
| H | L | H | L | L | L | L | L | L | L | L |
| H | L | H | L | H | L | L | L | L | L | L |
| H | L | H | H | L | L | L | L | L | L | L |
| H | L | H | H | H | L | L | L | L | L | L |
| H | H | L | L | L | L | L | L | H | L | L |
| H | H | L | L | H | L | L | L | H | L | H |
| H | H | L | H | L | L | L | L | H | L | H |
| H | H | L | H | H | L | L | L | H | H | L |
| H | H | H | L | L | L | L | L | H | H | L |
| H | H | H | L | H | L | L | L | H | H | H |
| H | H | H | H | L | H | H | H | H | H | H |
| H | H | H | H | H | L | L | L | L | L | L |

It has been found that the digital/analog converter 10 may be readily designed using this particular truth table, because it merely requires a simple arrangement of resistances connected between the open outputs $A_1$ to $A_6$ of the store 8 (at which the sequence of further sets of binary signals is produced in accordance with the truth table) and the source of reference voltage at the terminal 11. In order to provide a colour bar test based upon descending brightness values with a level reduction of the colour bars to 75% of the white level, the digital-to-analogue converter comprises three resistances R of equal value respectively connecting $A_4$ to $A_1$, $A_5$ to $A_2$ and $A_6$ to $A_3$, and three further equal value resistances R/3 respectively connecting the outputs $A_1$, $A_2$ and $A_3$ to the reference voltage at terminal 11. The value of each of the resistances R/3 is one third that of each of the resistances R.

Figure 3:
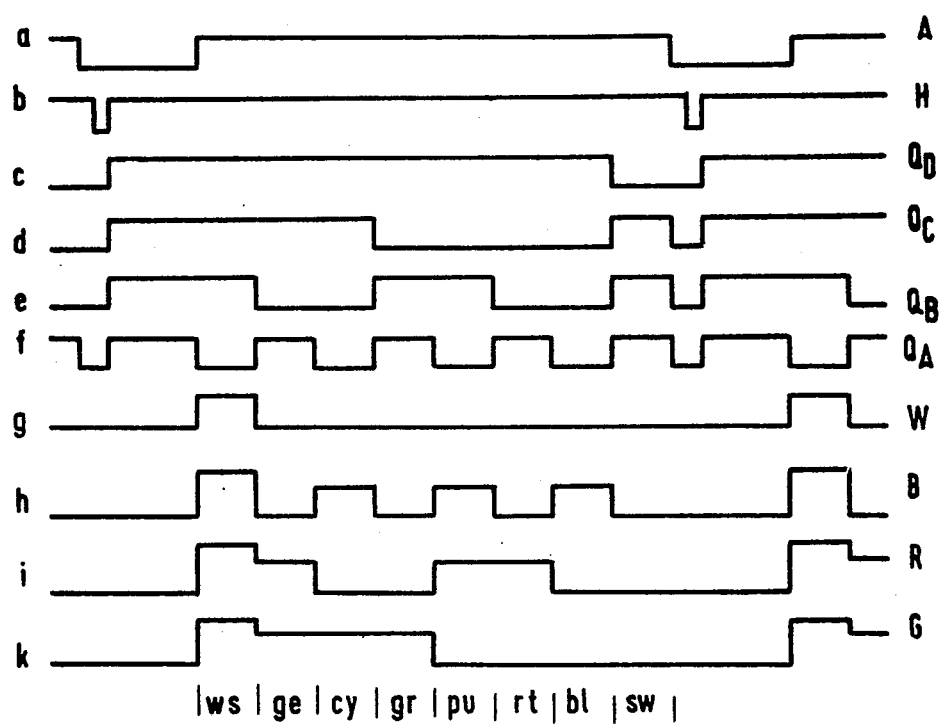
FIG. 3 is a voltage-time diagram for explaining the operation of the apparatus of FIGS. 1 and 2.

The voltage-time diagrams shown in FIG. 3 apply to the above described circuit arrangement set up for the generation of vertical colour bars. The diagrams illustrate one line period but the cycle is repeated for successive lines. FIG. 3a shows the blanking signal A applied to terminal 9 and FIG. 3b shows the horizontal frequency signal H applied to terminal 1. Under the above-stated condition that the start-stop oscillator 2 oscillates with ten times the horizontal frequency, FIGS. 3c to 3f show the sequence of sets of binary signals produced at the outputs $Q_D$ to $Q_A$ of the counter 6. It will be seen that the sequence of sets of binary signals generated by the counter 6 represent consecutive integers descending from fifteen. Corresponding to these sets of binary signals there are obtained at each of the outputs $A_4$ to $A_6$ of the translator 8 the binary signals represented in FIG. 3g. At the terminals 12 to 14 there are obtained the colour value signals R, G and B represented in FIGS. 3i, 3k and 3h respectively. An additive colour mixture of the signals available at the terminals 12, 13 and 14 will result in the line segments with the colour sequence white W, yellow Y, cyan CY, green G, purple P, red R, blue B, and black BL, with the level of the colour value signals in the range from yellow to blue being reduced to 75%. The vertical colour bars are built up in a succession of line periods by a repetition of the events of FIG. 3.

In the indicated (lower) position of the movable contacts of the changeover switches 4' and 4" colour value signals corresponding to vertically arranged colour bars are generated. In the upper position of the contacts, however, colour value signals are generated corresponding to horizontally arranged colour bars. In this setting the 5-bit counter counts the horizontal frequency pulses H received at terminal 1. After each 25 horizontal frequency pulses the 5-bit counter 3 is adapted to provide at its output a pulse, and thereby produces during each field period a series of signals at 1/25th of the horizontal frequency. These signals are delivered to the counting input 5 of the dual counter 6 through the changeover switch 4'. Thereafter the signals are handled by the apparatus in an identical manner to that previously described, but 250 times slower, with the signals of each series being used to produce, during the corresponding field period, a sequence of sets of colour value signals. Voltage-time diagrams similar to those of FIG. 3 are applicable also in the present case if the time scale is taken to be one field period rather than one line period. Thus each set of binary signals produced by the translator 8 is present for 25 lines rather than 1/10th of a line as before, so that a complete horizontal colour bar is produced by each set of binary signals rather than merely a line segment as before. The series of signals at 1/25th horizontal frequency produced by the counter 3 is repeated with identical timing in each field period whereby the horizontal colour bars are produced in the same positions from one field to the next. The setting of the 5-bit counter 3 and of the dual counter 6 at the beginning of each field period is effected by a vertical pulse signal V applied at terminal 15.

We claim:

1. An apparatus for producing video frequency colour value signals which correspond to a desired arrangement of vertical colour bars on a television screen, comprising means for producing during each of a plurality of successive line periods a series of signals having a separation less than the line period, means for applying each series of signals so produced to a sequence generator adapted to generate a predetermined sequence of sets of binary signals in response to each series of signals, each set of binary signals being generated in response to a respective one of the series of signals, a signal translator adapted to provide a predetermined sequence of further sets of binary signals in response to each sequence of firstmentioned sets of binary signals, each further set of binary signals being produced in response to a respective one of the firstmentioned sets and having binary values determined by the values of the said respective firstmentioned set, and a digital-to-analogue converter adapted to derive from each sequence of further sets of binary signals of a sequence of sets of colour value signals, the sets of colour value signals corresponding to the colours of the desired colour bars.

2. The apparatus of claim 1, wherein the series of signals has a frequency which is a multiple of the horizontal frequency, and wherein the generation of each sequence of firstmentioned sets of binary signals is triggered by a respective horizontal frequency signal.

3. The apparatus of claim 2, wherein the means for producing the series of signals comprises a start-stop oscillator.

4. The apparatus of claim 3, wherein the oscillation frequency of the oscillator is ten times the horizontal frequency.

5. The apparatus of claim 1, wherein the sequence generator comprises a settable binary counter.

6. The apparatus of claim 1, wherein the signal translator comprises a fixed value store.

7. The apparatus of claim 1, wherein each sequence of firstmentioned sets of binary signals represents a series of consecutive integers with each set having four bits, wherein the signal translator has four inputs for receiving the four bit of each firstmentioned set, a fifth input for receiving a binary blanking signal, and six outputs, wherein the translator operates according to the following truth table:

TABLE 1

| inputs: | | | | | outputs: | | | | | |
|---|---|---|---|---|---|---|---|---|---|---|
| $E_4$ | $E_3$ | $E_2$ | $E_1$ | $E_0$ | $A_6$ | $A_5$ | $A_4$ | $A_3$ | $A_2$ | $A_1$ |
| L | L | L | L | L | L | L | L | L | L | L |
| L | L | L | H | L | L | L | L | L | L | L |
| L | L | L | H | L | L | L | L | L | L | L |
| L | L | L | H | H | L | L | L | L | L | L |
| L | L | H | L | L | L | L | L | L | L | L |
| L | L | H | L | H | L | L | L | L | L | L |
| L | L | H | H | L | L | L | L | L | L | L |
| L | L | H | H | H | L | L | L | L | L | L |
| L | H | L | L | L | L | L | L | L | L | L |
| L | H | L | L | H | L | L | L | L | L | L |
| L | H | L | H | L | L | L | L | L | L | L |
| L | H | L | H | H | L | L | L | L | L | L |
| L | H | H | L | L | L | L | L | L | L | L |
| L | H | H | L | H | L | L | L | L | L | L |
| L | H | H | H | L | L | L | L | L | L | L |
| L | H | H | H | H | L | L | L | L | L | L |
| H | L | L | L | L | L | L | L | L | L | L |
| H | L | L | L | H | L | L | L | L | L | L |
| H | L | L | H | L | L | L | L | L | L | L |
| H | L | L | H | H | L | L | L | L | L | L |
| H | L | H | L | L | L | L | L | L | L | L |
| H | L | H | L | H | L | L | L | L | L | L |
| H | L | H | H | L | L | L | L | L | L | L |
| H | L | H | H | H | L | L | L | L | L | L |
| H | H | L | L | L | L | L | L | H | L | L |
| H | H | L | L | H | L | L | L | H | L | H |
| H | H | L | H | L | L | L | L | H | L | H |
| H | H | L | H | H | L | L | L | H | H | L |
| H | H | H | L | L | L | L | L | H | H | L |
| H | H | H | L | H | L | L | L | H | H | H |
| H | H | H | H | L | H | H | H | H | H | H |
| H | H | H | H | H | L | L | L | L | L | L | where $E_0$, $E_1$, $E_2$, $E_3$ represent the four inputs which receive the firstmentioned sets of binary signals, $E_4$ represents the input which receives the blanking signal, and $A_1$, $A_2$, $A_3$, $A_4$, $A_5$, $A_6$ represent the six outputs, and wherein the digital-to-analogue converter conprises three resistances of equal value respectively connecting transistor outputs $A_1$ to $A_4$, $A_2$ and $A_5$, and $A_3$, $A_6$, and three further resistances each having a value of one third that of each of the firstmentioned resistances and respectively connecting outputs $A_1$, $A_2$ and $A_3$ to a common reference voltage.

8. An apparatus for producing video frequency colour value signals which corresponding to a desired arrangement of horizontal colour bars on a television screen, comprising means for producing during each of a plurality of successive field periods a series of signals having a separation greater than one line period, means for applying each series of signals so produced to a sequence generator adapted to generate a predetermined sequence of tests of binary signals in response to each series of signals, each set of binary signals being generated in response to a respective one of the series of signals, a signal translator adapted to provide a predetermined sequence of further sets of binary signals in response to each sequence of firstmentioned sets of binary signals, each further set of binary signals being produced in response to a respective one of the firstmentioned sets and having binary values determined by the values of the said respective firstmentioned set, and a digital-to-analogue converter adapted to derive from each sequence of further sets of binary signals a sequence of sets of colour value signals, the sets of colour value signals corresponding to the colours of the desired colour bars.

9. The apparatus of claim 8, wherein the series of signals has a frequency which is a fraction of the horizontal frequency, and wherein the generation of each sequence of firstmentioned sets of binary signals is triggered by a respective vertical frequency signal.

10. The apparatus of claim 9, wherein the means for producing the series of signals comprises a counter arranged to count horizontal frequency signals.

11. The apparatus of claim 10, wherein the counter is a 5-bit counter.

12. The apparatus of claim 8, wherein the sequence generator comprises a settable binary counter.

13. The apparatus of claim 8, wherein the signal translator comprises a fixed value store.

14. The apparatus of claim 8, wherein each sequence of firstmentioned sets of binary signals represents a series of consecutive integers with each set having four bits, wherein the signal translator has four inputs for receiving the four bits of each firstmentioned set, a fifth input for receiving a binary blanking signal, and six outputs, wherein the translator operates according to the following truth table:

TABLE 1

| inputs: | | | | | outputs: | | | | | |
|---|---|---|---|---|---|---|---|---|---|---|
| $E_4$ | $E_3$ | $E_2$ | $E_1$ | $E_0$ | $A_6$ | $A_5$ | $A_4$ | $A_3$ | $A_2$ | $A_1$ |
| L | L | L | L | L | L | L | L | L | L | L |
| L | L | L | L | H | L | L | L | L | L | L |
| L | L | L | H | L | L | L | L | L | L | L |
| L | L | L | H | H | L | L | L | L | L | L |
| L | L | H | L | L | L | L | L | L | L | L |
| L | L | H | L | H | L | L | L | L | L | L |
| L | L | H | H | L | L | L | L | L | L | L |
| L | L | H | H | H | L | L | L | L | L | L |
| L | H | L | L | L | L | L | L | L | L | L |
| L | H | L | L | H | L | L | L | L | L | L |
| L | H | L | H | L | L | L | L | L | L | L |
| L | H | L | H | H | L | L | L | L | L | L |
| L | H | H | L | L | L | L | L | L | L | L |
| L | H | H | L | H | L | L | L | L | L | L |
| L | H | H | H | L | L | L | L | L | L | L |
| L | H | H | H | H | L | L | L | L | L | L |
| H | L | L | L | L | L | L | L | L | L | L |
| H | L | L | L | H | L | L | L | L | L | L |
| H | L | L | H | L | L | L | L | L | L | L |
| H | L | L | H | H | L | L | L | L | L | L |
| H | L | H | L | L | L | L | L | L | L | L |
| H | L | H | L | H | L | L | L | L | L | L |
| H | L | H | H | L | L | L | L | L | L | L |
| H | L | H | H | H | L | L | L | L | L | L |
| H | H | L | L | L | L | L | L | H | L | L |
| H | H | L | L | H | L | L | L | L | L | H |
| H | H | L | H | L | L | L | L | H | L | H |
| H | H | L | H | H | L | L | L | L | H | L |
| H | H | H | L | L | L | L | L | H | H | L |
| H | H | H | L | H | L | L | L | L | H | H |
| H | H | H | H | L | H | H | H | H | H | H |
| H | H | H | H | H | L | L | L | L | L | L | where $E_0$, $E_1$, $E_2$, $E_3$ represent the four inputs which receive the firstmentioned sets of binary signals, $E_4$ represents the input which receives the blanking signal, and $A_1$, $A_2$, $A_3$, $A_4$, $A_5$, $A_6$ represent the six outputs, and wherein the digital-to-analogue converter comprises three resistances of equal value respectively connecting translator outputs $A_1$ to $A_4$, $A_2$ to $A_5$, and $A_3$ to $A_6$, and three further resistances each having a value of one third that of each of the firstmentioned resistances and respectively connecting outputs $A_1$, $A_2$ and $A_3$ to a common reference voltage.

* * * * *

UNITED STATES PATENT AND TRADEMARK OFFICE
CERTIFICATE OF CORRECTION

PATENT NO. : 4,089,026
DATED : May 9, 1978
INVENTOR(S) : Wilhelm, Rudolf; Klein-Gerau; and Heitmann, Jurgen;

It is certified that error appears in the above-identified patent and that said Letters Patent are hereby corrected as shown below:

TABLE 1 in Column 4
TABLE 1 in Column 6
TABLE 1 in Column 8

In each instance above, the second line across under inputs should read --LLLLH-- and the fourth line from the bottom line of inputs should read --HHHLL--.

Signed and Sealed this

Seventh Day of November 1978

[SEAL]

Attest:

RUTH C. MASON
Attesting Officer

DONALD W. BANNER
Commissioner of Patents and Trademarks